United States Patent
Kim et al.

(10) Patent No.: US 11,949,802 B1
(45) Date of Patent: Apr. 2, 2024

(54) BLOCKCHAIN-BASED PLATFORM SYSTEM FOR INTERWORKING WITH ONE MACHINE-TO-MACHINE(oneM2M) AND LIGHTWEIGHT MACHINE-TO-MACHINE (LWM2M), AND METHOD OF IMPLEMENTING BLOCKCHAIN-BASED PLATFORM

(71) Applicant: Pusan National University Industry-University Cooperation Foundation, Busan (KR)

(72) Inventors: Ho-won Kim, Busan (KR); Donggyu Kim, Busan (KR); Hanho Jeong, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 18/501,033

(22) Filed: Nov. 3, 2023

Related U.S. Application Data

(63) Continuation of application No. PCT/KR2022/021486, filed on Dec. 28, 2022.

(30) Foreign Application Priority Data

Nov. 29, 2022 (KR) .......................... 10-2022-0163195

(51) Int. Cl.
H04L 9/00 (2022.01)
(52) U.S. Cl.
CPC ....................... H04L 9/50 (2022.05)
(58) Field of Classification Search
CPC ........................................... H04L 9/50
See application file for complete search history.

(56) References Cited

U.S. PATENT DOCUMENTS

| | | | |
|---|---|---|---|
| 11,393,024 B1* | 7/2022 | Kodihalli | G06Q 40/03 |
| 11,558,423 B2* | 1/2023 | Gordon | H04L 63/0245 |

(Continued)

FOREIGN PATENT DOCUMENTS

| | | |
|---|---|---|
| KR | 20170033424 A | 3/2017 |
| KR | 20180061150 A | 6/2018 |

(Continued)

OTHER PUBLICATIONS

International Search Report dated Aug. 11, 2023 for PCT/KR2022/021486. In conformance with MPEP 609—Concise explanation of the relevance includes issue date of foreign OA and references cited therein.

*Primary Examiner* — Taghi T Arani
*Assistant Examiner* — Blake I Narramore
(74) *Attorney, Agent, or Firm* — CANTOR COLBURN LLP

(57) ABSTRACT

A blockchain-based platform system for interworking with one machine-to-machine (oneM2M) and lightweight machine-to-machine (LWM2M) and a method of implementing a blockchain-based platform are provided. The blockchain-based platform system for interworking with oneM2M and LWM2M includes a hyperledger fabric network configured to validate chaincode called in association with a first client application and generate an event in association with the validated chaincode, and a fabric bridge gateway configured to perform interworking with an LWM2M protocol and a oneM2M platform by transmitting a request or a response corresponding to the event to a second client application.

6 Claims, 8 Drawing Sheets

(56) References Cited

U.S. PATENT DOCUMENTS

| | | | | |
|---|---|---|---|---|
| 11,727,795 | B1* | 8/2023 | Shen | G06F 21/6254 |
| | | | | 382/105 |
| 11,874,827 | B2* | 1/2024 | Wood | G06F 8/65 |
| 2020/0076884 | A1* | 3/2020 | Li | H04L 9/0637 |
| 2020/0274934 | A1* | 8/2020 | Smith | H04L 47/82 |
| 2023/0412402 | A1* | 12/2023 | Sethi | H04L 9/50 |

FOREIGN PATENT DOCUMENTS

| | | |
|---|---|---|
| KR | 20190065372 A | 6/2019 |
| KR | 20190128814 A | 11/2019 |
| KR | 102214647 B1 | 2/2021 |
| KR | 20210056866 A | 5/2021 |
| KR | 20220072623 A | 6/2022 |

\* cited by examiner

BLOCKCHAIN-BASED PLATFORM SYSTEM FOR INTERWORKING WITH ONE MACHINE-TO-MACHINE(oneM2M) AND LIGHTWEIGHT MACHINE-TO-MACHINE (LWM2M), AND METHOD OF IMPLEMENTING BLOCKCHAIN-BASED PLATFORM

CROSS-REFERENCE TO RELATED APPLICATIONS

This application is a continuation application, claiming priority under § 365(c), of an International application No. PCT/KR2022/021486, filed on Dec. 28, 2022, which is based on and claims the benefit of a Korean patent application number 10-2022-0163195, filed on Nov. 29, 2022, in the Korean Intellectual Property Office, the disclosure of each of which is incorporated by reference herein in its entirety.

TECHNICAL FIELD

The present invention proposes a model for mutually connecting Internet of things (IoT) data of a one machine-to-machine (oneM2M) platform and a lightweight machine-to-machine (LWM2M) protocol through a blockchain and relates to a blockchain-based platform system for interworking with oneM2M and LWM2M and a method of implementing a blockchain-based platform.

Particularly, the present invention provides a blockchain-based platform managed by multiple peers wherein IoT data of the oneM2M platform and LWM2M protocol is not centrally stored through a blockchain.

BACKGROUND ART

A oneM2M platform may be a representative service platform standard and may be an IoT service platform standard established by several major standardization organizations to develop an integrated common service platform environment.

FIG. 1 is a configuration of a oneM2M platform.

A common services entity (CSE) 110 may be a part implementing a common services function (CSF) that is various functions of oneM2M. An example of the CSF may be storage and management of IoT data (DMR), message delivery management (CMDH), subscription, and notification of modification of IoT data (Sub/Noti).

MCa may refer to communication between M2M and application entity (AE) 120, Mcn may refer to communication between M2M and a network, and Mcc' may refer to communication with a CSE at a remote M2M location.

In oneM2M, smooth communication and/or function interworking may be allowed between CSEs of different devices meeting the standard.

An LWM2M protocol may be a protocol developed for a device with a constraint according to the purpose of development, and through optimization of a network resource, multiple devices may be simultaneously connected to one LWM2M and may be controlled.

FIG. 2 illustrates a configuration of an LWM2M protocol.

The LWM2M protocol may be configured in an LWM2M client 210 and an LWM2M server 220.

Security, such as constrained application protocol (CoAP), datagram transport layer security (DTLS), and the like, may apply between the LWM2M client and the LWM2M server.

4 interfaces may exist between the LWM2M client and the LWM2M server. The 4 interfaces may be bootstrapping, client registration, object/resource access, and information reporting.

The LWM2M client may retain a management object including a resource (IoT data).

The LWM2M server may be connected to multiple devices.

FIG. 3 is a diagram illustrating an interworking model between oneM2M and LWM2M.

An interworking proxy application entity (IPE) may be a model proposed for cooperation between an LWM2M protocol 310 and a oneM2M platform 320.

A device (or an AE) in the LWM2M protocol 310 may generate an LWM2M object.

The IPE may store the generated LWM2M object in a content sharing resource (CSR). The device (or the AE) in the oneM2M platform may allow to use a function and a service of the LWM2M protocol by hosting to the CSR.

A service provider may support the interworking of two types of platforms due to the interworking of the oneM2M platform 320 and the LWM2M protocol 310.

However, in the IPE structure, IoT data may be centrally stored in the CSR.

Therefore, in the IPE structure, there is a problem that a privacy threat may occur due to the centralized storage of IoT data.

In addition, because IoT data is recorded in the CSR in the IPE structure, there is the problem of whether the stored IoT data is reliable.

Accordingly, to solve the problems described above in the IPE structure, research has been conducted to store and implement IoT data in a blockchain in interworking with the oneM2M platform 320 and the LWM2M protocol 310. However, the problem of interworking two platforms still exists.

Therefore, there is a demand for an improved method of interworking IoT data of the oneM2M platform 320 and the LWM2M protocol 310.

DISCLOSURE OF THE INVENTION

Technical Goals

According to one embodiment of the present invention, by proposing a blockchain-based platform managed by multiple peers without centrally storing generated IoT data in a oneM2M platform and an LWM2M protocol, a problem due to centralized storage of IoT data in an existing interworking proxy application entity (IPE) structure may be solved.

In addition, in the present invention, by proposing a model for interworking IoT data of a oneM2M platform and IoT data of an LWM2M platform through a blockchain, a problem caused by IoT data of a oneM2M platform that is not interworked with IoT data of an LWM2M protocol may be solved.

In addition, in the present invention, by proposing a blockchain-based platform for improving the integrity of collected IoT data by preventing the IoT data from forgery or alteration, the integrity of IoT data may be improved using the blockchain.

Technical Solutions

According to one embodiment of the present invention, a blockchain-based platform system for interworking with oneM2M and LWM2M, the blockchain-based platform system includes a hyperledger fabric network configured to validate chaincode called in association with a first client application and generate an event in association with the validated chaincode, and a fabric bridge gateway configured to perform interworking with an LWM2M protocol and a oneM2M platform by transmitting a request or a response corresponding to the event to a second client application.

When the interworking is for communication from a oneM2M application to an LWM2M server, the hyperledger fabric network is configured to validate request chaincode called by the oneM2M application that is the first client application, and in association with the validated request chaincode, when data transmitted by the oneM2M application to the request chaincode is recorded in a ledger by the request chaincode, generate a request event, and the fabric bridge gateway is configured to transmit a request corresponding to the request event to the LWM2M server that is the second client application and receive a response from the LWM2M server.

The hyperledger fabric network is configured to validate response chaincode called by the fabric bridge gateway receiving the response, in association with the validated response chaincode, when the data recorded in the ledger is identified by the response chaincode, generate a response event, and transmit the response event to the oneM2M application.

The fabric bridge gateway is configured to recognize that the interworking is for communication from the oneM2M application to the LWM2M server by simultaneously registering an event listener registered in the oneM2M application before calling the request chaincode.

When the interworking is for communication from an LWM2M client to a oneM2M application, the fabric bridge gateway is configured to, in response to a request being received from the LWM2M client that is the first client application, call request chaincode, and the hyperledger fabric network is configured to validate the called request chaincode, when data transmitted by the LWM2M client to the request chaincode is recorded in a ledger by the request chaincode, generate a request event, and transmit the request event to the oneM2M application that is the second client application.

As the response chaincode corresponding to the request event is called by the oneM2M application, the hyperledger fabric network is configured to validate response chaincode called by the oneM2M application, and in association with the validated response chaincode, when the data recorded in the ledger is identified by the response chaincode, generate a response event, and the fabric bridge gateway is configured to transmit a response corresponding to the response event to the LWM2M client.

According to one embodiment of the present invention, a method of implementing a blockchain-based platform for interworking with oneM2M and LWM2M, the method includes, in a hyperledger fabric network, validating chaincode called in association with a first client application, in the hyperledger fabric network, generating an event in association with the validated chaincode, in a fabric bridge gateway, performing interworking with an LWM2M protocol and a oneM2M platform by transmitting a request or a response corresponding to the event to a second client application.

The method further includes, when the interworking is for communication from a oneM2M application to an LWM2M server, in the hyperledger fabric network, validating request chaincode called by the oneM2M application that is the first client application, in the hyperledger fabric network, in association with the validated request chaincode, when data transmitted by the oneM2M application to the request chaincode is recorded in a ledger by the request chaincode, generating a request event, and in the fabric bridge gateway, transmitting a request corresponding to the request event to the LWM2M server that is the second client application, and receiving a response from the LWM2M server.

The method further includes, in the hyperledger fabric network, validating the response chaincode called by the fabric bridge gateway receiving the response, in association with the validated response chaincode, when the data recorded in the ledger is identified by the response chaincode, generating a response event, and transmitting the response event to the oneM2M application.

The method further includes, in the fabric bridge gateway, recognizing that the interworking is for communication from the oneM2M application to the LWM2M server by simultaneously registering an event listener registered in the oneM2M application before calling the request chaincode.

The method further includes, when the interworking is for communication from an LWM2M client to a oneM2M application, in the fabric bridge gateway, in response to a request being received from the LWM2M client that is the first client application, calling the request chaincode, in the hyperledger fabric network, validating the called request chaincode, in the hyperledger fabric network, in association with the validated request chaincode, when data transmitted by the oneM2M application to the request chaincode is recorded in a ledger by the request chaincode, generating a request event, and in the hyperledger fabric network, transmitting the request event to the oneM2M application that is the second client application.

The method further includes, as the response chaincode corresponding to the request event is called by the oneM2M application, in the hyperledger fabric network, validating the response chaincode called by the oneM2M application, in the hyperledger fabric network, in association with the validated response chaincode, when the data recorded in the ledger is identified by the response chaincode, generating a response event, and in the fabric bridge gateway, transmitting a response corresponding to the response event to the LWM2M client.

According to one embodiment of the present invention, a blockchain-based platform system for interworking with oneM2M and LWM2M, the blockchain-based platform system includes a hyperledger fabric network configured to validate chaincode called in association with a first client application and generate an event in association with the validated chaincode, and a fabric bridge gateway configured to perform interworking with an LWM2M protocol and a oneM2M platform by transmitting a request or a response corresponding to the event to a second client application, wherein, when the interworking is for communication from a oneM2M application to an LWM2M server, the first client application is the oneM2M application and the second client application is the LWM2M server, the hyperledger fabric network is configured to validate request chaincode called by the oneM2M application that is the first client application, and in association with the validated request chaincode, when data transmitted by the oneM2M application to the request chaincode is recorded in a ledger by the request chaincode, generate a request event, and the fabric bridge gateway is configured to transmit a request corresponding to the request event to the LWM2M server that is the second client application and receive a response from the LWM2M server.

According to one embodiment of the present invention, a method of implementing a blockchain-based platform for interworking with oneM2M and LWM2M, the method includes, in a hyperledger fabric network, validating chaincode called in association with a first client application, in the hyperledger fabric network, generating an event in association with the validated chaincode, in a fabric bridge gateway, performing interworking with an LWM2M protocol and a oneM2M platform by transmitting a request or a response corresponding to the event to a second client application, when the interworking is for communication from a oneM2M application to an LWM2M server, in the hyperledger fabric network, validating request chaincode called by the oneM2M application that is the first client application, in the hyperledger fabric network, in association with the validated request chaincode, when data transmitted by the oneM2M application to the request chaincode is recorded in a ledger by the request chaincode, generating a request event, and in the fabric bridge gateway, transmitting a request corresponding to the request event to the LWM2M server that is the second client application, and receiving a response from the LWM2M server.

Effects

An embodiment of the present invention provides a blockchain-based platform system for interworking with oneM2M and LWM2M and a method of implementing a blockchain-based platform by proposing a blockchain-based platform managed by multiple peers without centrally storing generated IoT data in a oneM2M platform and an LWM2M protocol to solve a problem due to centralized storage of IoT data in an existing IPE structure.

In addition, an embodiment of the present invention is provided to solve a problem caused by IoT data of a oneM2M platform that is not interworked with IoT data of an LWM2M protocol by proposing a model for interworking IoT data of a oneM2M platform and IoT data of an LWM2M platform through a blockchain.

In addition, an embodiment of the present invention is provided to improve the integrity of IoT data by using a blockchain by proposing a blockchain-based platform for improving the integrity of collected IoT data by preventing the IoT data from forgery or alteration.

BEST MODE FOR CARRYING OUT THE INVENTION

Figure 1:
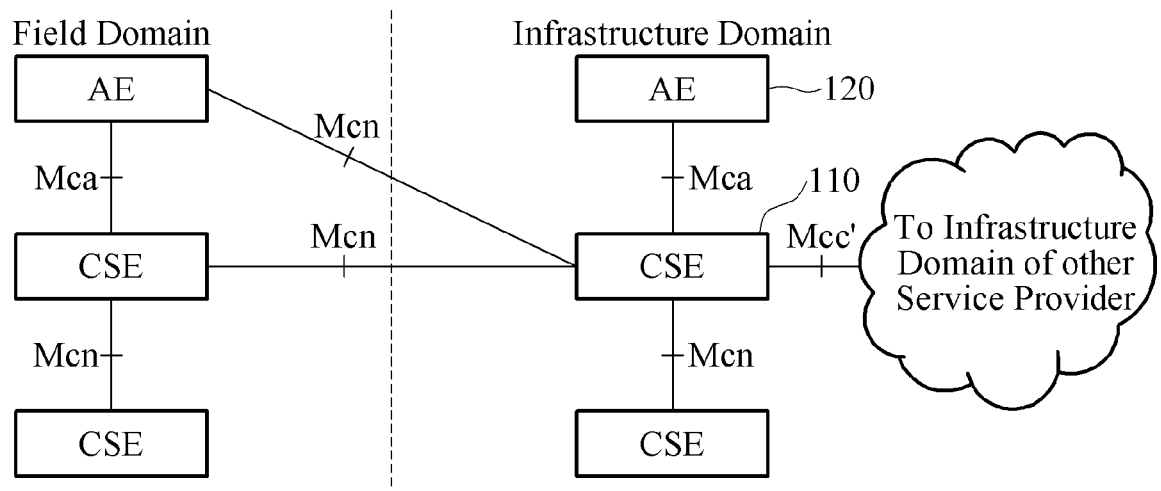
FIG. 1 is a configuration of a one machine-to-machine (oneM2M) platform.
Figure 2:
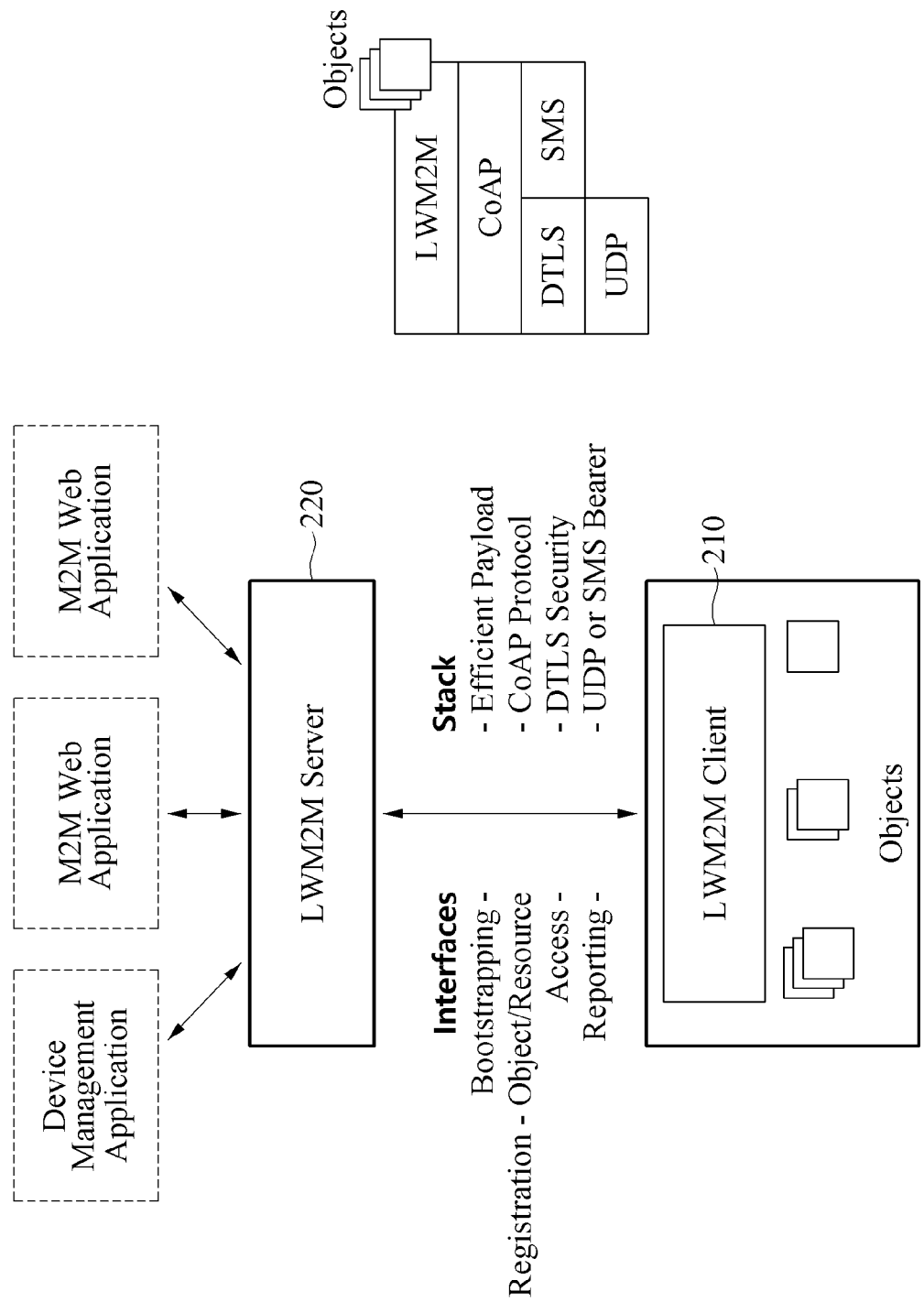
FIG. 2 illustrates a configuration of a lightweight machine-to-machine (LWM2M) protocol.
Figure 3:
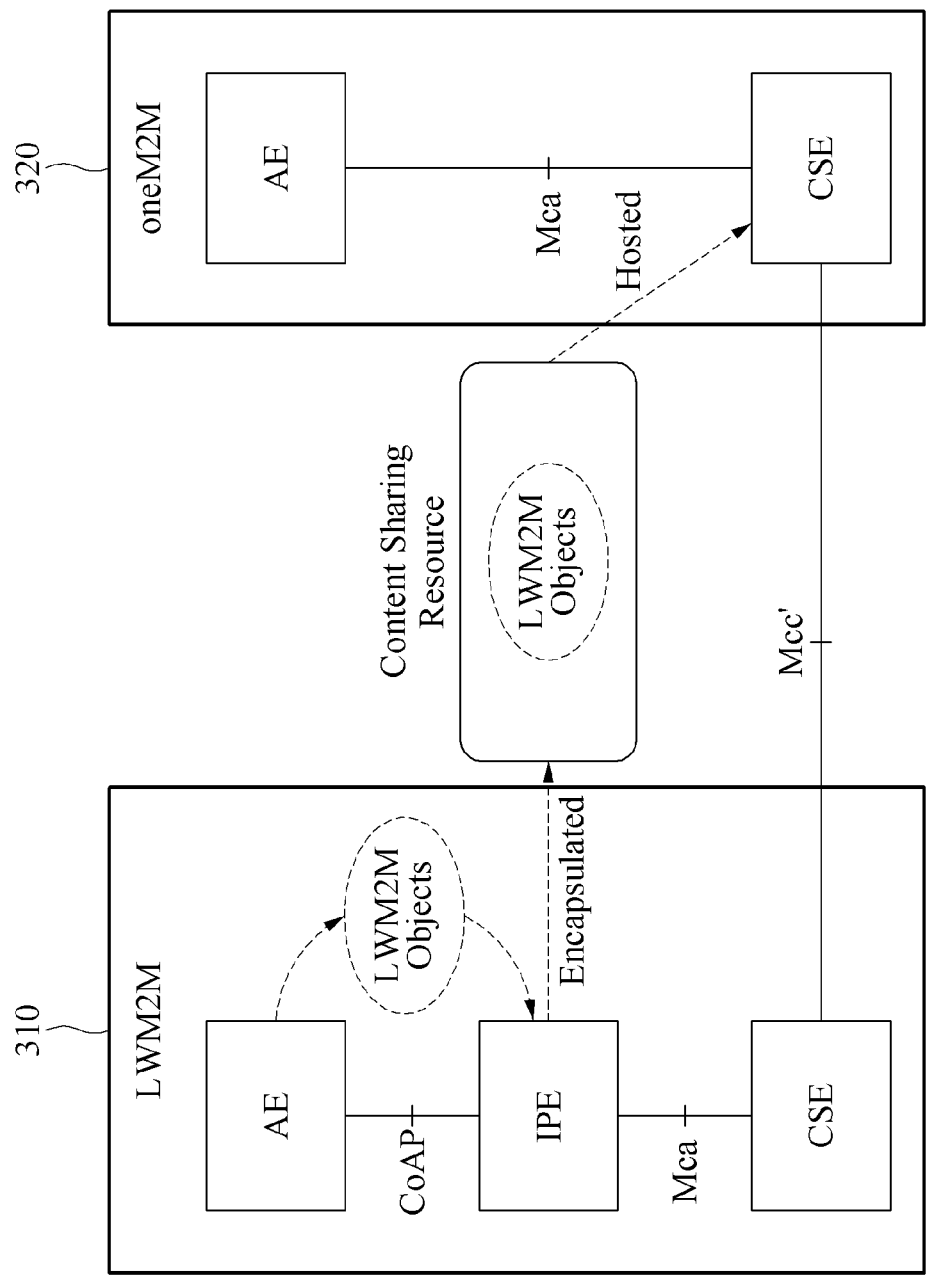
FIG. 3 is a diagram illustrating an interworking model between oneM2M and LWM2M.

Hereinafter, example embodiments will be described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Figure 4:
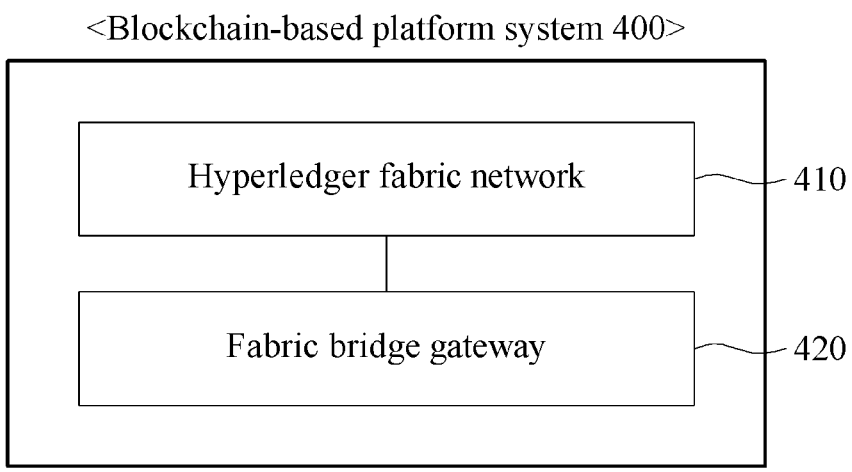
FIG. 4 is a block diagram illustrating a configuration of a blockchain-based platform system to interwork with oneM2M and LWM2M, according to one embodiment of the present invention.

FIG. 4 is a block diagram illustrating a configuration of a blockchain-based platform system to interwork with oneM2M and LWM2M, according to one embodiment of the present invention.

Referring to FIG. 4, a blockchain-based platform system for interworking with oneM2M and LWM2M 400 (hereinafter, referred to as a "blockchain-based platform system") may include a hyperledger fabric network 410 and a fabric bridge gateway 420.

Firstly, the hyperledger fabric network 410 may validate chaincode called in association with a first client application. That is, the hyperledger fabric network 410 may determine the validity of predetermined chaincode called by a client.

The chaincode may be data consecutively concatenating blocks respectively representing transactions through a cryptographic method. The chaincode may be required to update a new item in a ledger or read an existing item in a hyperledger fabric environment and recorded data may not be forged or altered.

In this case, the first client application may be a oneM2M application of a terminal connected to a oneM2M platform and may be an LWM2M client belonging to an LWM2M protocol.

The first client application may differently specify a oneM2M application or an LWM2M client according to a communication direction of an embodiment.

In addition, the hyperledger fabric network 410 may generate an event in association with the validated chaincode. That is, the hyperledger fabric network 410 may serve to generate an event in association with the first client application by the chaincode.

The fabric bridge gateway 420 may perform interworking with the LWM2M protocol and the oneM2M platform by transmitting a request or a response corresponding to the event to a second client application. That is, the fabric bridge gateway 420 may serve to interwork with the LWM2M protocol and the oneM2M platform by receiving an event from the hyperledger fabric network 410 and transmitting a request or a response corresponding to the event to the second client application.

In this case, the second client application may be an LWM2M server belonging to the LWM2M protocol or a oneM2M application of a terminal connected to the oneM2M platform.

According to a communication direction of an embodiment, when the first client application is a oneM2M application, the second client application may specify an LWM2M server and when the first client application is an LWM2M, the second client application may specify a oneM2M application.

Interworking for communication from a oneM2M application to an LWM2M server may be an example of interworking with the LWM2M protocol and the oneM2M platform.

When the interworking is for communication from a oneM2M application to an LWM2M server, the first client application may be a oneM2M application and the second client application may be specified as an LWM2M server.

When the interworking is for communication from a oneM2M application to an LWM2M server, the oneM2M application and the fabric bridge gateway 420 may recognize that the interworking is related to communication from the oneM2M application to the LWM2M server by simultaneously registering an event listener.

Simultaneous registration of the event listener may be performed before the oneM2M application calls the request chaincode.

The hyperledger fabric network 410 may validate the request chaincode called by the oneM2M application, which is the first client application, and in association with the validated request chain code, when data transmitted to the request chaincode from the oneM2M application is recorded in a ledger by the request chaincode, the hyperledger fabric network 410 may generate a request event.

Thereafter, the fabric bridge gateway 420 may transmit a request corresponding to the request event to the LWM2M server, which is the second client application, and may receive a response from the LWM2M server.

In addition, the hyperledger fabric network 410 may validate the response chaincode called by the fabric bridge gateway that receives the response, and in association with the validated response chaincode, when the data recorded in the ledger is identified by the response chaincode, the hyperledger fabric network 410 may generate a response event and may transmit the response event to the oneM2M application.

Through this, the blockchain-based platform system 400 may return a response from the LWM2M server with respect to a request occurred by the oneM2M application, and thereby may interwork with the LWM2M protocol and the oneM2M platform through a blockchain method managed by multiple peers without centralized storage.

Interworking for communication from an LWM2M client to a oneM2M application may be another example of interworking with the LWM2M protocol and the oneM2M platform.

When the interworking is for communication from the LWM2M client to the oneM2M application, the first client application may be an LWM2M client and the second client application may be specified as a oneM2M application.

The fabric bridge gateway 420 may call the request chaincode in response to the reception of a request from the LWM2M client, which is the first client application.

Thereafter, the hyperledger fabric network 410 may validate the called request chaincode. In association with the validated request chaincode, when data transmitted to the request chaincode by the LWM2M client is recorded in the ledger by the request chaincode, the hyperledger fabric network 410 may generate a request event and may transmit the request event to the oneM2M application, which is the second client application.

As the response chaincode corresponding to the request event is called by the oneM2M application, the hyperledger fabric network 410 may validate the response chaincode called by the oneM2M application, and in association with the validated response chaincode, when the data recorded in the ledger is identified by the response chaincode, the hyperledger fabric network 410 may generate a response event.

In addition, the fabric bridge gateway 420 may transmit the response corresponding to the response event to the LWM2M client.

Through this, the blockchain-based platform system 400 may return a response from the oneM2M application with respect to a request occurred by the LWM2M client and thereby may interwork with the LWM2M protocol and the oneM2M platform through a blockchain method managed by multiple peers without centralized storage.

According to one embodiment of the present invention, by proposing a blockchain-based platform managed by multiple peers without centrally storing generated IoT data in a oneM2M platform and an LWM2M protocol, a problem due to centralized storage of IoT data in an existing interworking proxy application entity (IPE) structure may be solved.

In addition, in the present invention, by proposing a model for interworking IoT data of a oneM2M platform and IoT data of an LWM2M platform through a blockchain, a problem caused by IoT data of a oneM2M platform that is not interworked with IoT data of an LWM2M protocol may be solved.

In addition, in the present invention, by proposing a blockchain-based platform for improving the integrity of collected IoT data by preventing the IoT data from forgery or alteration, the integrity of IoT data may be improved using the blockchain.

Figure 5:
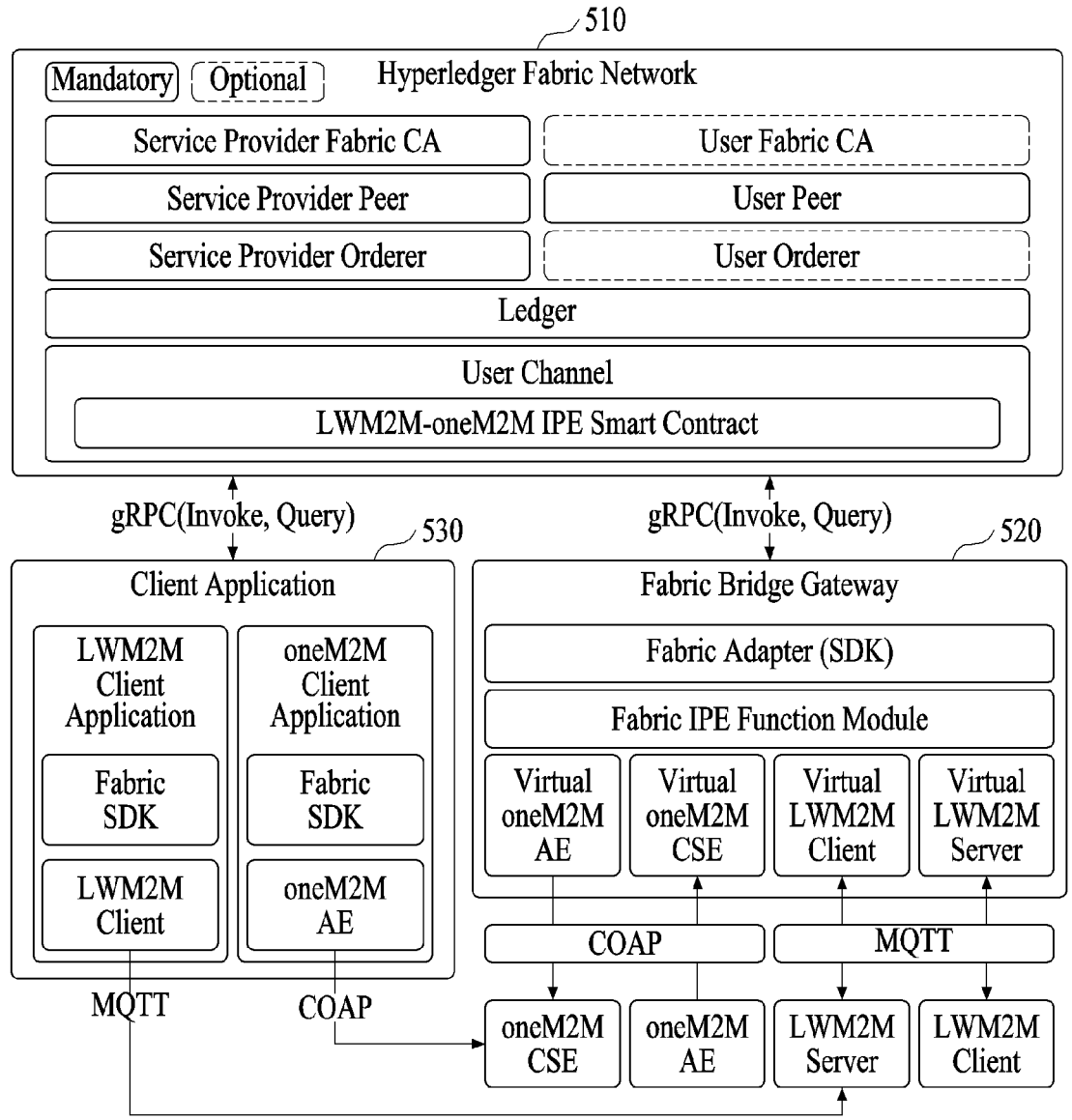
FIG. 5 is a diagram illustrating a configuration of a blockchain-based platform system according to the present invention.

FIG. 5 is a diagram illustrating a configuration of a blockchain-based platform system according to the present invention.

As shown in FIG. 5, a blockchain-based platform system 400 may include a hyperledger fabric network 510, a fabric bridge gateway 520, and an external client application 530.

The hyperledger fabric network 510 may be a permissioned blockchain and may include a peer that is a node participating in the blockchain, a certificate authority (CA) for managing a certificate of a peer, an orderer for organizing a transaction occurring in the blockchain, a ledger for storing data of the blockchain, a channel that is a logical element sharing the ledger, and a smart contract that is chaincode executed by a peer.

The external client application 530 may be divided into two types, which are a oneM2M application and an LWM2M client, and may communicate with the hyperledger fabric network 510 through a fabric software development kit (SDK).

The fabric bridge gateway 520 may include a oneM2M CSE, a oneM2M AE, an LWM2M server, and an LWM2M client, and may communicate with the hyperledger fabric network 510 and the external client application 530 because the fabric bridge gateway 520 may also include a fabric adapter (SDK).

IoT data may be transmitted by a device connected to the fabric bridge gateway 520 or the external client application 530. The IoT data may be stored in the hyperledger fabric network 510 after passing through the fabric bridge gateway 520 or may pass through the hyperledger fabric network 510 first and then may be transmitted to the fabric bridge gateway 520. These processes may be recorded in the ledger through an agreement process through the smart contract that is chaincode of the hyperledger fabric network 510.

Figure 6:
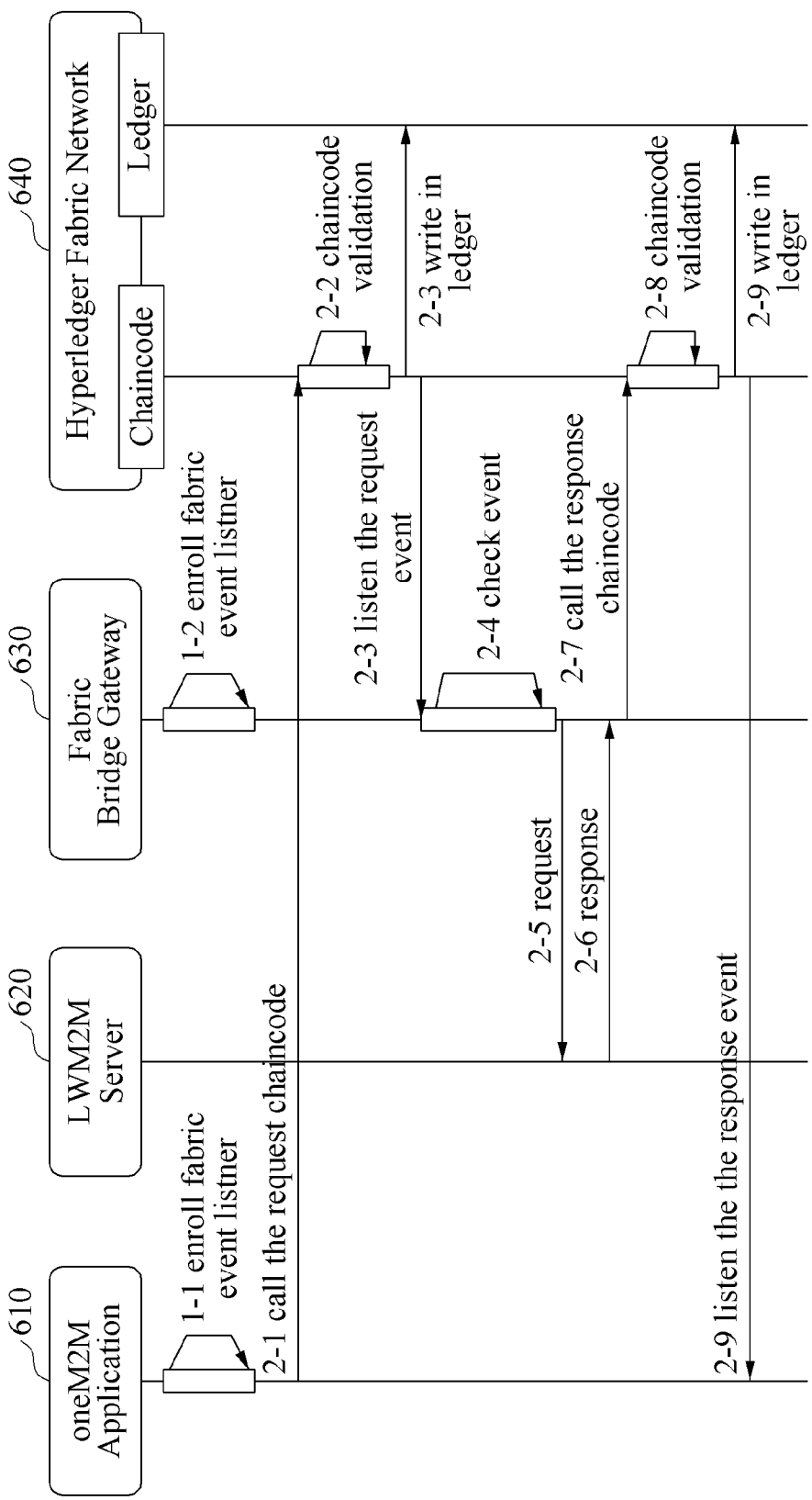
FIG. 6 is a diagram illustrating a communication operating procedure from a oneM2M application to an LWM2M server.

FIG. 6 is a diagram illustrating a communication operating procedure from a oneM2M application to an LWM2M server.

FIG. 6 illustrates an operation procedure when communicating from a oneM2M application 610 to an LWM2M server 620.

In operation 1-1, the oneM2M application 610 may register an event listener and in operation 1-2, a fabric bridge gateway 630 may register an event listener.

For example, the event listener may be registered by a command as follows:
gateway=connection.gateway;
contract=connection.contract;
contract.addContractListener(async (event)=>{

In operation 2-1, the oneM2M application 610 may call request chaincode.

For example, the request chaincode may be registered by a command as follows:
const chaincodeResponse=await contract.submitTransaction(
    "CreateIPEData",
    JSON.stringify(onem2mData) );

In operation 2-2, a hyperledger fabric network 640 may validate the called request chaincode.

In operation 2-3, the hyperledger fabric network 640 may transmit a request event generated in association with the request chaincode to the fabric bridge gateway 630 and may record the request event in a ledger.

For example, the request event may be generated by a command as follows:
ctx.GetStub( ).SetEvent("createIPEData", [ ]byte(result))

In addition, the request event may be recorded in the ledger by a command as follows:

```
{
    "_id": "Bulb1_2022-11-07 18:16",
    "_rev": "2-f8209ab9b776ef5ce0bd47188cf7af58",
    "data": "bulb_on",
    "doctype": "IPE",
    "from": "oneM2MApp",
    "sensor": "Bulb1",
    "time": "2022-11-08 18:16",
    "to": "lwm2mServer",
    "~version": "CgMBBQA"
}
```

In operation 2-4, the fabric bridge gateway 630 may identify the request event.

For example, the request event may be identified by a command as follows:
const payload=event.payload.toString("utf-8");
const payloadJson=JSON.parse(payload);
const {data, sensor, from, to, time}=payloadJson In operation 2-5, the fabric bridge gateway 630 may transmit a request corresponding to the request event to the LWM2M server 620.

For example, the request may be transmitted by a command as follows:
createIPEDate {"doctype": "IPE", "data": "bulb on", "sensor": "Bulb1", "from": "oneM2MApp", "to": "lwM2MServer", "time": "2022-11-07 18:16"}

In operation 2-6, the LWM2M server 620 may process the request and may transmit a response to the fabric bridge gateway 630.

In operation 2-7, the fabric bridge gateway 630 may call the response chaincode.

For example, the response chaincode may be called by a command as follows:
const chaincodeResponse=await contract.submitTransaction(
    "CreateIPEData",
    JSON.stringify(responseData)
);

In operation 2-8, the hyperledger fabric network 640 may validate the called response chaincode.

In operation 2-9, the hyperledger fabric network 640 may transmit a response event generated in association with the response chaincode to the oneM2M application 610 and may record the response event in the ledger.

For example, the response event may be recorded in the ledger by a command as follows:

```
{
    "_id": "Bulb1_2022-11-07 18:17",
    "_rev": "2-2e51c13dbee40300b72b29455f91375f",
    "data": "bulb_on_success",
    "doctype": "IPE",
    "from": "lwm2mClient",
    "sensor": "Bulb1",
    "time": "2022-11-08 18:17",
    "to": "oneM2MApp",
    "~version": "CgMBYgA="
}
```

Figure 7:
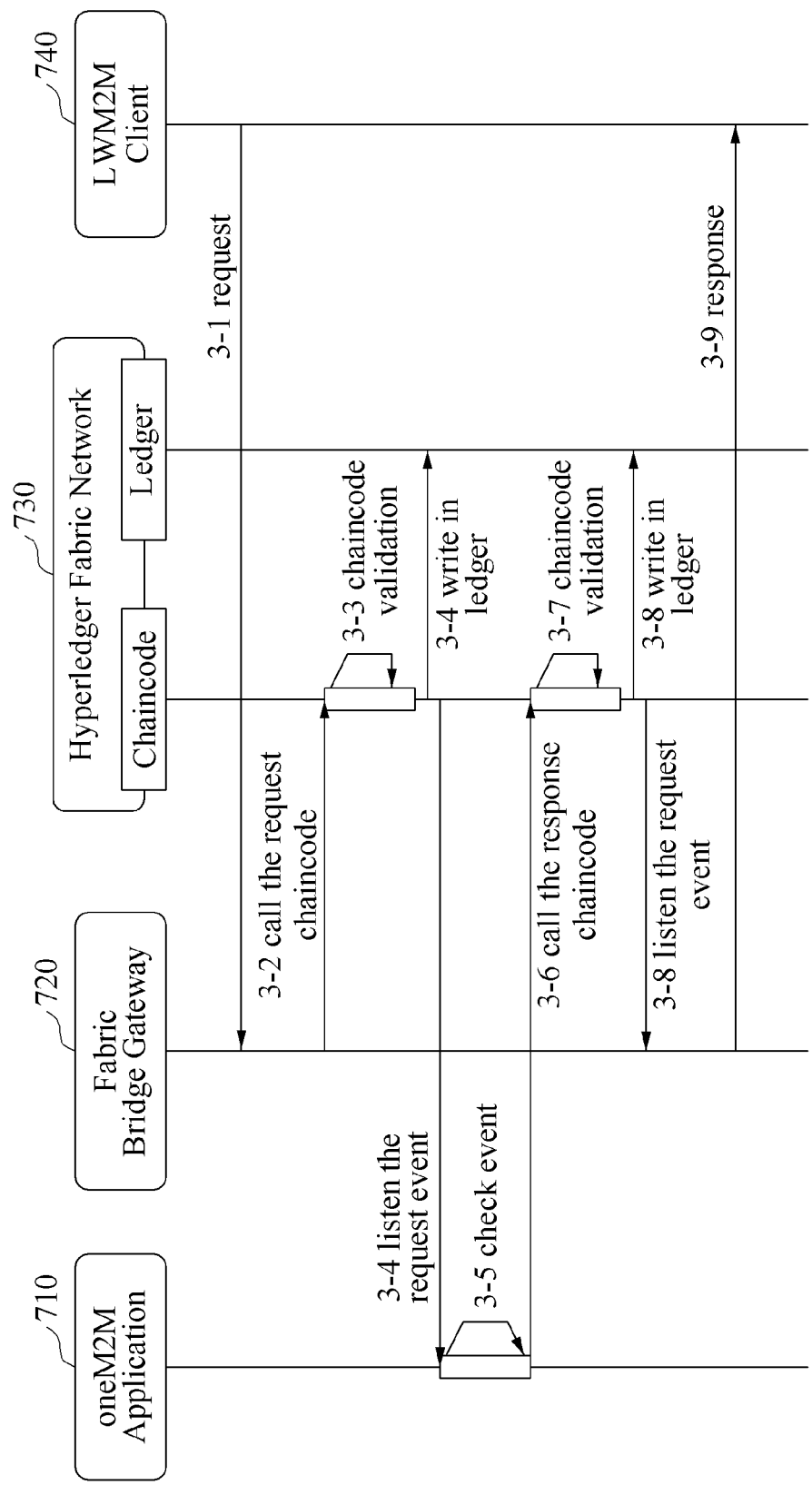
FIG. 7 is a diagram illustrating a communication operating procedure from an LWM2M client to a oneM2M application.

FIG. 7 is a diagram illustrating a communication operating procedure from an LWM2M client to a oneM2M application.

FIG. 7 illustrates an operation procedure when communicating from an LWM2M client 740 to a oneM2M application 710.

In operation 3-1, the LWM2M client 740 may transmit a request to a fabric bridge gateway 720.

For example, the request may be transmitted by a command as follows:

```
const lwm2mData = {
    Data: "bulb_on",
    Sensor: "Bulb1",
    From: "lwm2mClient",
    To: "oneM2MCSE",
    Time: "2022-11-08 09:54",
};
res,write(JSON.stringify(lwm2mData));
```

In operation 3-2, in response to the request being received, the fabric bridge gateway 720 may call the request chaincode.

For example, the request chaincode may be called by a command as follows:

```
observedData.forEach(asyne (od) => {
    const bufferedData = await contract.submitTransaction(
        "CreateIPEData",
        observedData
    );
});
```

In operation 3-3, the hyperledger fabric network 730 may validate the called request chaincode.

In operation 3-4, the hyperledger fabric network 730 may transmit a request event generated in association with the request chaincode to the oneM2M application 710 and may record the request event in a ledger.

For example, the request event may be generated and recorded in the ledger by a command as follows:

```
{
    "_id": "Bulb1_2022-11-08 09:54",
    "_rev": "1-21ee55fdef59b9d47575328483028a8e",
    "data": "bulb_on",
    "doctype": "IPE",
    "from": "lwm2mClient",
    "sensor": "Bulb1",
    "time": "2022-11-08 09:54",
    "to": "oneM2MCSE",
    "~version": "CgQBCQFf"
}
```

In operation 3-5, the oneM2M application 710 may identify the request event.

In operation 3-6, the oneM2M application 710 may call the response chaincode corresponding to the request event.

For example, the response chaincode may be called by a command as follows:

const chaincodeResponse=await contract.submitTransaction(
   "CreateIPEData",
   JSON.stringify(responseData)
);

In operation 3-7, the hyperledger fabric network 730 may validate the called response chaincode.

In operation 3-8, the hyperledger fabric network 730 may transmit a response event generated in association with the response chaincode to the fabric bridge gateway 720 and may record the response event in the ledger.

For example, the response event may be generated by a command as follows:

ctx.Get Stub( ).SetEvent("createIPEData", [ ]byte(result))

In addition, the response event may be recorded in the ledger by a command as follows:

```
{
    "_id": "Bulb1_2022-11-08 09:54",
    "_rev": "3-6e5e4eb2f577114f3c52ecb383fc6b04",
    "data": "bulb_on_success",
    "doctype": "IPE",
    "from": "oneM2MCSE",
    "sensor": "Bulb1",
    "time": "2022-11-08 09:54",
```

-continued

```
    "to": "lwm2mClient",
    "~version": "CgMBHwA="
}
```

In operation 3-9, the fabric bridge gateway 720 may transmit a response corresponding to the response event to the LWM2M client 740.

For example, the response may be transmitted by a command as follows:

createIPEDate {"doctype": "IPE", "data": "bulb on success", "sensor": "Bulb1", "from": "oneM2MC SE", "to": "1wm2mclient", "time": "2022-11-08 09: 54"}

Hereinafter, a detailed description of an implementation flow of the blockchain-based platform system 400 for interworking with oneM2M and LWM2M according to embodiments of the present invention is provided.

Figure 8:
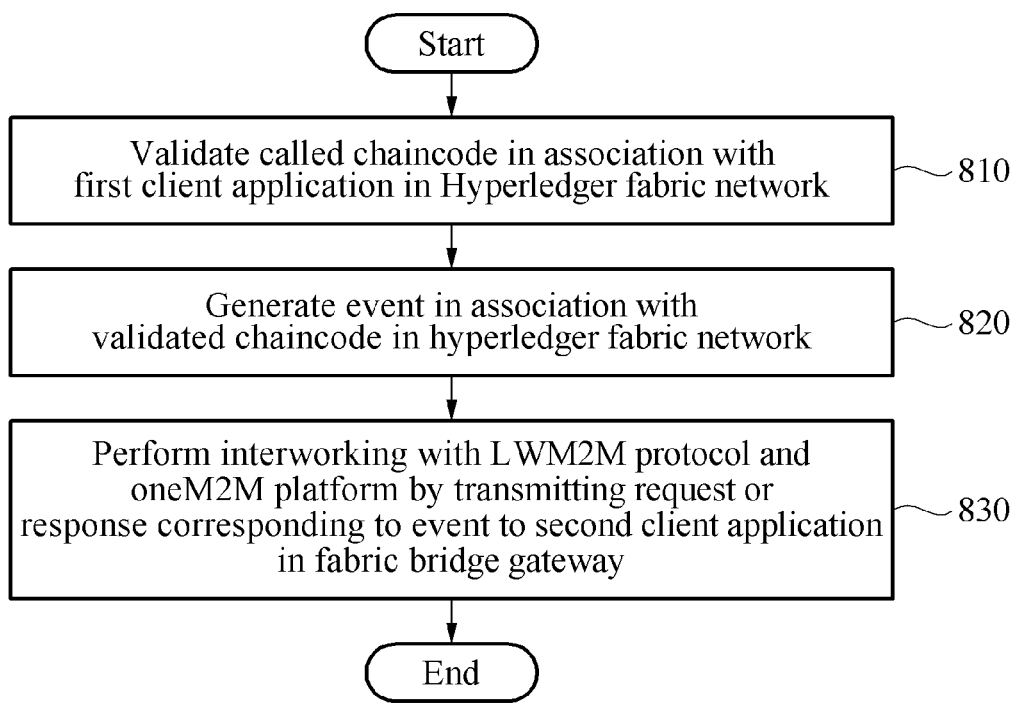
FIG. 8 is a flowchart illustrating a method of implementing a blockchain-based platform to interwork with oneM2M and LWM2M, according to one embodiment of the present invention.

FIG. 8 is a flowchart illustrating a method of implementing a blockchain-based platform to interwork with oneM2M and LWM2M, according to one embodiment of the present invention.

A method of implementing a blockchain-based platform for interworking with oneM2M and LWM2M according to one embodiment may be performed by the blockchain-based platform system 400 for interworking with oneM2M and LWM2M.

Firstly, in operation 810, in a hyperledger fabric network of the blockchain-based platform system 400, chaincode called in association with a first client application may be validated. Operation 810 may be an operation of the hyperledger fabric network to determine the validity of predetermined chaincode that is called by a client. Operation 810 may be performed by a processor included in the hyperledger fabric network.

The chaincode may be data consecutively concatenating blocks respectively representing transactions through a cryptographic method. The chaincode may be required to update a new item in a ledger or read an existing item in a hyperledger fabric environment and recorded data may not be forged or altered.

In this case, the first client application may be a oneM2M application of a terminal connected to a oneM2M platform and may be an LWM2M client belonging to an LWM2M protocol.

The first client application may differently specify a oneM2M application or an LWM2M client according to a communication direction of an embodiment.

In addition, in operation 820, in the hyperledger fabric network of the blockchain-based platform system 400, an event in association with the validated chaincode may be generated. Operation 820 may be an operation of the hyperledger fabric network to generate an event in association with the first client application by the chaincode. Operation 820 may be performed by a processor included in the hyperledger fabric network.

In operation 830, in a fabric bridge gateway of the blockchain-based platform system 400, interworking with the LWM2M protocol and the oneM2M platform may be performed by transmitting a request or a response corresponding to the event to a second client application. Operation 830 may be an operation of the fabric bridge gateway to interwork with the LWM2M protocol and the oneM2M platform by receiving an event from the hyperledger fabric network and transmitting a request or a response corresponding to the event to the second client application. Operation 830 may be performed by a processor included in the fabric bridge gateway.

In this case, the second client application may be an LWM2M server belonging to the LWM2M protocol or a oneM2M application of a terminal connected to the oneM2M platform.

According to a communication direction of an embodiment, when the first client application is a oneM2M application, the second client application may specify an LWM2M server and when the first client application is an LWM2M, the second client application may specify a oneM2M application.

Interworking for communication from a oneM2M application to an LWM2M server may be an example of interworking with the LWM2M protocol and the oneM2M platform.

When the interworking is for communication from a oneM2M application to an LWM2M server, the first client application may be a oneM2M application and the second client application may be specified as an LWM2M server.

When the interworking is for communication from a oneM2M application to an LWM2M server, the oneM2M application and the fabric bridge gateway may recognize that the interworking is related to communication from the oneM2M application to the LWM2M server by simultaneously registering an event listener.

Simultaneous registration of the event listener may be performed before the oneM2M application calls the request chaincode.

The hyperledger fabric network may validate the request chaincode called by the oneM2M application, which is the first client application, and in association with the validated request chain code, when data transmitted to the request chaincode from the oneM2M application is recorded in a ledger by the request chaincode, the hyperledger fabric network may generate a request event.

Thereafter, the fabric bridge gateway may transmit a request corresponding to the request event to the LWM2M server, which is the second client application, and may receive a response from the LWM2M server.

In addition, the hyperledger fabric network may validate the response chaincode called by the fabric bridge gateway that receives the response, and in association with the validated response chaincode, when the data recorded in the ledger is identified by the response chaincode, the hyperledger fabric network 410 may generate a response event and may transmit the response event to the oneM2M application.

Through this, the blockchain-based platform system 400 may return a response from the LWM2M server with respect to a request occurred by the oneM2M application and thereby may interwork with the LWM2M protocol and the oneM2M platform through a blockchain method managed by multiple peers without centralized storage.

Interworking for communication from an LWM2M client to a oneM2M application may be another example of interworking with the LWM2M protocol and the oneM2M platform.

When the interworking is for communication from the LWM2M client to the oneM2M application, the first client application may be an LWM2M client and the second client application may be specified as a oneM2M application.

The fabric bridge gateway may call the request chaincode in response to the reception of a request from the LWM2M client, which is the first client application.

Thereafter, the hyperledger fabric network 410 may validate the called request chaincode. In association with the validated request chaincode, when data transmitted to the request chaincode by the LWM2M client is recorded in the ledger by the request chaincode, the hyperledger fabric network 410 may generate a request event and may transmit the request event to the oneM2M application, which is the second client application.

As the response chaincode corresponding to the request event is called by the oneM2M application, the hyperledger fabric network may validate the response chaincode called by the oneM2M application, and in association with the validated response chaincode, when the data recorded in the ledger is identified by the response chaincode, the hyperledger fabric network may generate a response event.

In addition, the fabric bridge gateway may transmit the response corresponding to the response event to the LWM2M client.

Through this, the blockchain-based platform system 400 may return a response from the oneM2M application with respect to a request occurred by the LWM2M client and thereby may interwork with the LWM2M protocol and the oneM2M platform through a blockchain method managed by multiple peers without centralized storage.

According to one embodiment of the present invention, by proposing a blockchain-based platform managed by multiple peers without centrally storing generated IoT data in a oneM2M platform and an LWM2M protocol, a problem due to centralized storage of IoT data in an existing interworking proxy application entity (IPE) structure may be solved.

In addition, in the present invention, by proposing a model for interworking IoT data of a oneM2M platform and IoT data of an LWM2M platform through a blockchain, a problem caused by IoT data of a oneM2M platform that is not interworked with IoT data of an LWM2M protocol may be solved.

In addition, in the present invention, by proposing a blockchain-based platform for improving the integrity of collected IoT data by preventing the IoT data from forgery or alteration, the integrity of IoT data may be improved using the blockchain.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape, optical media such as CD-ROM discs, DVDs, and/or Blue-ray discs, magneto-optical media such as optical discs, and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described example examples, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A blockchain-based platform system for interworking with one machine-to-machine (oneM2M) and lightweight machine-to-machine (LWM2M), the blockchain-based platform system comprising:
a hyperledger fabric network configured to validate chaincode called in association with a first client application and generate an event in association with the validated chaincode; and
a fabric bridge gateway configured to perform interworking with an LWM2M protocol and a oneM2M platform by transmitting a request or a response corresponding to the event to a second client application,
wherein, when the interworking is for communication from a oneM2M application to an LWM2M server, the first client application is the oneM2M application and the second client application is the LWM2M server,
the hyperledger fabric network is configured to validate request chaincode called by the oneM2M application that is the first client application, and in association with the validated request chaincode, when data transmitted by the oneM2M application to the request chaincode is recorded in a ledger by the request chaincode, generate a request event, and
the fabric bridge gateway is configured to transmit a request corresponding to the request event to the LWM2M server that is the second client application and receive a response from the LWM2M server,
wherein, when the interworking is for communication from an LWM2M client to a oneM2M application, the first client application is the LWM2M client and the second client application is the oneM2M application, the fabric bridge gateway is configured to, in response to a request being received from the LWM2M client that is the first client application, call request chaincode, and the hyperledger fabric network is configured to: validate the called request chaincode, when data transmitted by the LWM2M client to the request chaincode is recorded in a ledger by the request chaincode, generate a request event, and transmit the request event to the oneM2M application that is the second client application, and
wherein, as the response chaincode corresponding to the request event is called by the oneM2M application, the hyperledger fabric network is configured to validate response chaincode called by the oneM2M application, and in association with the validated response chaincode, when the data recorded in the ledger is identified by the response chaincode, generate a response event, and the fabric bridge gateway is configured to transmit a response corresponding to the response event to the LWM2M client.

2. The blockchain-based platform system of claim 1, wherein the hyperledger fabric network is configured to:
validate response chaincode called by the fabric bridge gateway receiving the response,
in association with the validated response chaincode, when the data recorded in the ledger is identified by the response chaincode, generate a response event, and
transmit the response event to the oneM2M application.

3. The blockchain-based platform system of claim 1, wherein the fabric bridge gateway is configured to recognize that the interworking is for communication from the oneM2M application to the LWM2M server by simultaneously registering an event listener registered in the oneM2M application before calling the request chaincode.

4. A method of implementing a blockchain-based platform for interworking with one machine-to-machine (oneM2M) and lightweight machine-to-machine (LWM2M), the method comprising:
in a hyperledger fabric network, validating chaincode called in association with a first client application;
in the hyperledger fabric network, generating an event in association with the validated chaincode;
in a fabric bridge gateway, performing interworking with an LWM2M protocol and a oneM2M platform by transmitting a request or a response corresponding to the event to a second client application;
when the interworking is for communication from a oneM2M application to an LWM2M server, in the hyperledger fabric network, validating request chaincode called by the oneM2M application that is the first client application;
in the hyperledger fabric network, in association with the validated request chaincode, when data transmitted by the oneM2M application to the request chaincode is recorded in a ledger by the request chaincode, generating a request event; and
in the fabric bridge gateway, transmitting a request corresponding to the request event to the LWM2M server that is the second client application, and receiving a response from the LWM2M server, when the interworking is for communication from an LWM2M client to a oneM2M application, in the fabric bridge gateway, in response to a request being received from the LWM2M client that is the first client application, calling the request chaincode; in the hyperledger fabric network, validating the called request chaincode; in the hyperledger fabric network, in association with the validated request chaincode, when data transmitted by the oneM2M application to the request chaincode is recorded in a ledger by the request chaincode, generating a request event; and in the hyperledger fabric network, transmitting the request event to the oneM2M application that is the second client application, and as the response chaincode corresponding to the request event is called by the oneM2M application, in the hyperledger fabric network, validating the response chaincode called by the oneM2M application; in the hyperledger fabric network, in association with the validated response chaincode, when the data recorded in the ledger is identified by the response chaincode, generating a response event; and in the fabric bridge gateway, transmitting a response corresponding to the response event to the LWM2M client.

5. The method of claim 4, further comprising:

in the hyperledger fabric network, validating the response chaincode called by the fabric bridge gateway receiving the response;

in association with the validated response chaincode, when the data recorded in the ledger is identified by the response chaincode, generating a response event; and transmitting the response event to the oneM2M application.

6. The method of claim 4, further comprising:

in the fabric bridge gateway, recognizing that the interworking is for communication from the oneM2M application to the LWM2M server by simultaneously registering an event listener registered in the oneM2M application before calling the request chaincode.

* * * * *